US012559255B2

(12) United States Patent
Gallo et al.

(10) Patent No.: US 12,559,255 B2
(45) Date of Patent: Feb. 24, 2026

(54) METHOD AND DEVICE FOR MANUFACTURING A STRUCTURAL ELEMENT IN COMPOSITE MATERIAL WITH A Z-SHAPED PROFILE

(71) Applicant: LEONARDO S.P.A., Rome (IT)

(72) Inventors: Nicola Gallo, Grottaglie (IT); Stefano Giuseppe Corvaglia, Grottaglie (IT); Nicola Miani, Grottaglie (IT); Luca Monopoli, Grottaglie (IT); Antonio Ruberto, Grottaglie (IT); Marco Barile, Grottaglie (IT)

(73) Assignee: LEONARDO S.P.A., Rome (IT)

( * ) Notice: Subject to any disclaimer, the term of this patent is extended or adjusted under 35 U.S.C. 154(b) by 300 days.

(21) Appl. No.: 18/037,469

(22) PCT Filed: Nov. 23, 2021

(86) PCT No.: PCT/IB2021/060870
§ 371 (c)(1),
(2) Date: May 17, 2023

(87) PCT Pub. No.: WO2022/107109
PCT Pub. Date: May 27, 2022

(65) Prior Publication Data
US 2024/0076060 A1 Mar. 7, 2024

(30) Foreign Application Priority Data
Nov. 23, 2020 (IT) ........................ 102020000028046

(51) Int. Cl.
*B64F 5/10* (2017.01)
*B29C 70/38* (2006.01)
(Continued)

(52) U.S. Cl.
CPC ................ *B64F 5/10* (2017.01); *B29C 70/38* (2013.01); *B29C 70/446* (2013.01);
(Continued)

(58) Field of Classification Search
CPC . B64F 5/10; B29C 70/38; B29C 70/44; B29C 70/541; B29C 70/544; B64C 1/064
(Continued)

(56) References Cited

U.S. PATENT DOCUMENTS

| | | | |
|---|---|---|---|
| 7,943,076 B1 * | 5/2011 | Hawkins | B29C 70/545 156/196 |
| 2011/0097554 A1 | 4/2011 | Kehrl et al. | |
| 2014/0072775 A1 | 3/2014 | De Mattia | |

FOREIGN PATENT DOCUMENTS

| | | |
|---|---|---|
| CN | 103338914 A | 10/2013 |
| DE | 102008057783 | 2/2010 |

(Continued)

OTHER PUBLICATIONS

International Search Report and Written Opinion in corresponding International Patent Application No. PCT/IB2021/060870, mailed Mar. 22, 2022 (14 pages).

(Continued)

*Primary Examiner* — James D Sells
(74) *Attorney, Agent, or Firm* — Leason Ellis LLP

(57) ABSTRACT

A method is described for manufacturing a structural element in composite material extending along a straight or curvilinear longitudinal direction, having a Z-shaped cross section and comprising, in its final configuration, a central web and two flanges extending at a given final angle from opposite end portions of the web in respective directions opposite to one another; the method including the steps of: arranging a plurality of layers of composite material on a shaped portion of a forming mold; laminating the layers on (Continued)

the shaped portion so that the web is arranged, at least partially, in its final configuration, that a first flange is arranged in its final configuration at the final angle with respect to the portion of the web arranged in its final configuration, and that a second flange is arranged in its initial configuration at an initial angle distinct from, and greater than, said final angle with respect to the portion of the web arranged in its final configuration; moving a movable portion of the forming mold, which is movable with respect to a fixed portion of the forming mold, from a rest position to a bending position; displacing the second flange from the initial configuration into a final configuration in which it is at said final angle with respect to the portion of the web arranged in its final configuration; the step d) of displacing being carried out by means of the step c) of moving.

6 Claims, 6 Drawing Sheets

(51) Int. Cl.

| | | |
|---|---|---|
| *B29C 70/44* | (2006.01) | |
| *B29C 70/46* | (2006.01) | |
| *B29C 70/54* | (2006.01) | |
| *B64C 1/06* | (2006.01) | |
| *B29L 31/30* | (2006.01) | |
| *B64C 1/00* | (2006.01) | |

(52) U.S. Cl.
CPC .......... *B29C 70/461* (2021.05); *B29C 70/541* (2013.01); *B64C 1/064* (2013.01); *B29L 2031/3082* (2013.01); *B64C 2001/0072* (2013.01); *B64C 1/06* (2013.01)

(58) Field of Classification Search
USPC ......................................................... 156/242
See application file for complete search history.

(56) References Cited

FOREIGN PATENT DOCUMENTS

| | | |
|---|---|---|
| EP | 2308670 | 4/2011 |
| EP | 3196006 | 7/2017 |
| GB | 2486231 | 6/2012 |
| WO | 2020121648 | 6/2020 |

OTHER PUBLICATIONS

International Preliminary Report on Patentability in corresponding International Patent Application No. PCT/IB2021/060870, mailed Mar. 1, 2023 (9 pages).
Written Opinion of the International Preliminary Examining Authority in corresponding International Patent Application No. PCT/IB2021/060870, mailed Oct. 26, 2022 (8 pages).
Chinese Office Action in CN Application No. 202180078849.9, mailed Jul. 31, 2025, an English translation attached hereto (13 pages).

* cited by examiner

METHOD AND DEVICE FOR MANUFACTURING A STRUCTURAL ELEMENT IN COMPOSITE MATERIAL WITH A Z-SHAPED PROFILE

CROSS-REFERENCE TO RELATED APPLICATIONS

This patent application is a U.S. National Phase Application under 35 U.S.C. § 371 of International Patent Application No. PCT/IB2021/060870, filed on Nov. 23, 2021, which claims priority from Italian patent application no. 102020000028046, filed on Nov. 23, 2020, all of which are incorporated by reference, as if expressly set forth in their respective entireties.

TECHNICAL SECTOR

The present invention relates to a method for manufacturing a structural element in composite material extending along a straight or curvilinear longitudinal direction and having a cross section Z-shaped with respect to the longitudinal direction, in particular a structural element in composite material used in the aeronautical field and forming part of the structure of an aeroplane, for example a beam, a stringer, a spar or the like of the fuselage of an aircraft, to which the following description will explicitly refer without losing generality.

The present invention also relates to a device for the manufacture of a structural element in composite material extending along a straight or curvilinear longitudinal direction and having a cross section Z-shaped with respect to the longitudinal direction, in particular a structural element in composite material used in aeronautical field and forming part of the structure of an aeroplane, for example a beam, a stringer, a spar or the like of the fuselage of an aircraft, to which the following description will explicitly refer without losing generality.

BACKGROUND

Structural elements, for example fuselages and parts thereof, made in composite material, used in the aviation field are known. The use of said material is dictated by the need to reduce the overall weight of aeroplanes and to eliminate or minimize the corrosion problems of aeronautical structures.

According to the state of the art, there are aeronautical structural elements that are produced in light alloy and, therefore, in metallic material, which must then be applied to the fuselage.

The use of said metallic elements and their assembly in contact with the structures in composite material cause problems of galvanic coupling with related risks of corrosion of the metal and the need to increase inspection levels. This leads to an increase in total costs for the producers of these components and, therefore, for the airlines.

Therefore, the need to make these structural elements also in composite material arises.

The use of the composite material allows to reduce the overall weight of aircraft and to obtain at the same time very strong structures.

In order to produce the above structural elements, a plurality of layers of non-cured or pre-cured composite material is placed on a suitably shaped forming tool, depending on the shape to be imparted to the structural element.

The composite material is usually a fiber material. In particular, each layer normally consists of a thermosetting (resin) matrix prepreg reinforced with fibers of various kinds such as carbon fibers, aramid fibers, glass fibers, etc.

The layers thus obtained are laminated together on the forming tool.

After lamination, a forming process is carried out on a forming mold usually with the aid of vacuum: in this way, the layers are compacted and the desired shape (e.g. T, Z, C, omega profile, etc.) is given to the structural element.

The assembly thus formed is subsequently subjected to a curing process on a curing mold by applying high pressure and temperature, so as to cure the composite material and compact the aforesaid layers together.

Structural elements in composite material are known extending along a straight or curvilinear longitudinal direction and having a cross section Z-shaped with respect to the longitudinal direction (i.e. having a Z profile), for example beams, stringers, spars, or the like and having: a central portion defining the web of the structural element and two end portions arranged on opposite sides of the web and defining two respective wings or flanges orthogonal to the web and extending in directions opposite to one another so as to precisely define the Z-shaped profile.

The need is felt in the sector to produce structural elements in composite material with a Z-shaped profile by means of operations that can be easily automated, preferably by means of automatic operations and without the manual aid of any operator.

Object and Summary of the Invention

Aim of the present invention is to provide a method for manufacturing a composite structural element extending along a straight or curved longitudinal direction and having a cross section Z-shaped with respect to the longitudinal direction, which enables to satisfy in a simple and economical way the above-mentioned eed connected to the structural elements in composite material with a Z-shaped cross section of a known type.

According to the invention, this aim is achieved by a method for manufacturing a structural element in composite material with a Z-shaped cross section as described herein and set forth in the appended claims, such as claim 1.

A further aim of the present invention is to realize a device for the manufacture of a structural element in composite material extending along a straight or curved longitudinal direction and having a cross section Z-shaped with respect to the longitudinal direction, which enables to satisfy in a simple and economical way the above-mentioned need connected to the structural elements in composite material with a Z-shaped cross section of a known type.

According to the invention, this aim is achieved by a device for the manufacture of a structural element in composite material with a Z-shaped cross section as described herein and set forth in the appended claims.

BRIEF DESCRIPTION OF THE DRAWINGS

For a better understanding of the present invention, some preferred non-limiting embodiments are described below, purely by way of example and with the aid of the attached drawings, in which.

DETAILED DESCRIPTION

With reference to the attached figures, number 1 denotes a device for the manufacture of a structural element 2 in composite material extending along a curvilinear longitudinal direction D and having a cross section Z-shaped with respect to the longitudinal direction.

In particular, the structural element 2 has a Z-shaped profile and is a multilayer element used in the aeronautical field and forming part of the structure of an aeroplane (not shown), for example a beam, a stringer, a spar or the like of the fuselage of an aircraft, to which this description will refer without losing generality.

In one embodiment not shown, the structural element 2 could extend along a straight longitudinal direction.

The structural element 2 is conveniently used to strengthen an aircraft fuselage in order to reduce its overall weight and at the same time obtain a strong structure.

In the example described, the structural element 2 has a significantly greater extension along the longitudinal direction D than the extension in the other two directions orthogonal to this longitudinal direction D.

Figure 1:
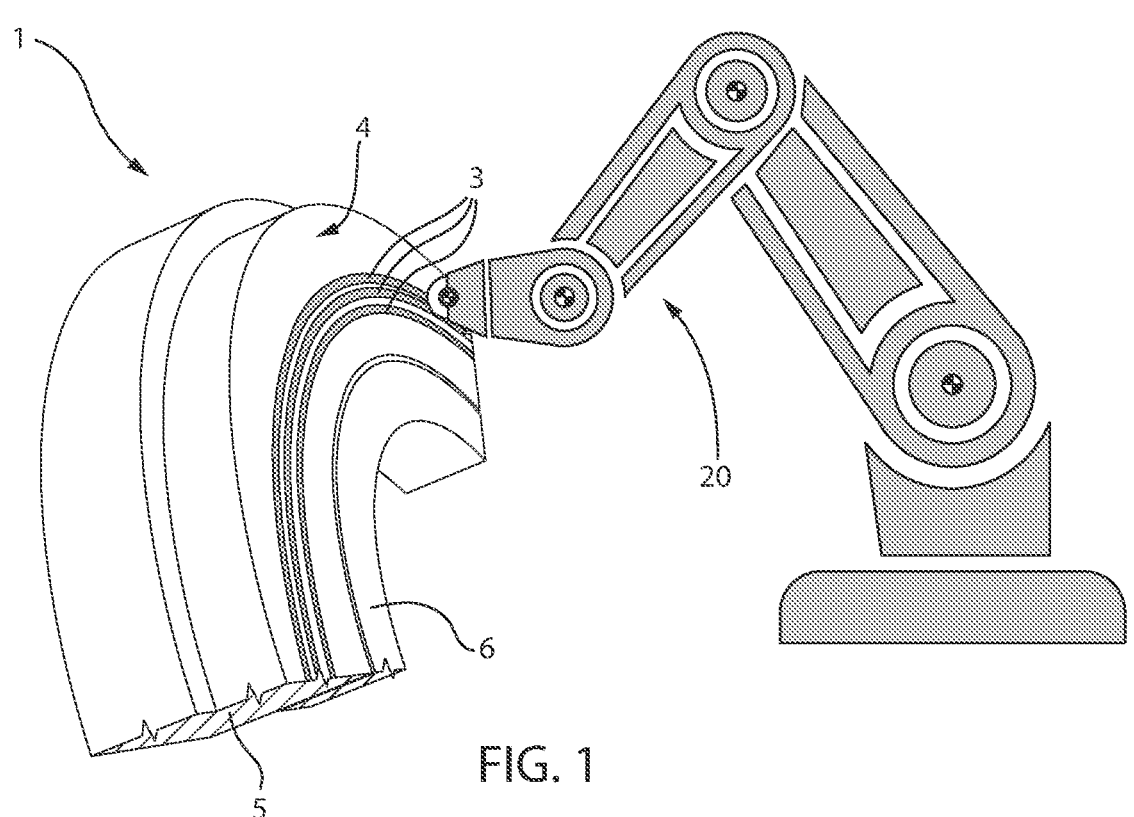
FIG. 1 is a perspective view, with parts removed for clarity's sake, of part of a device for the manufacture of a structural element in composite material with a Z-shaped profile.
Figure 2:
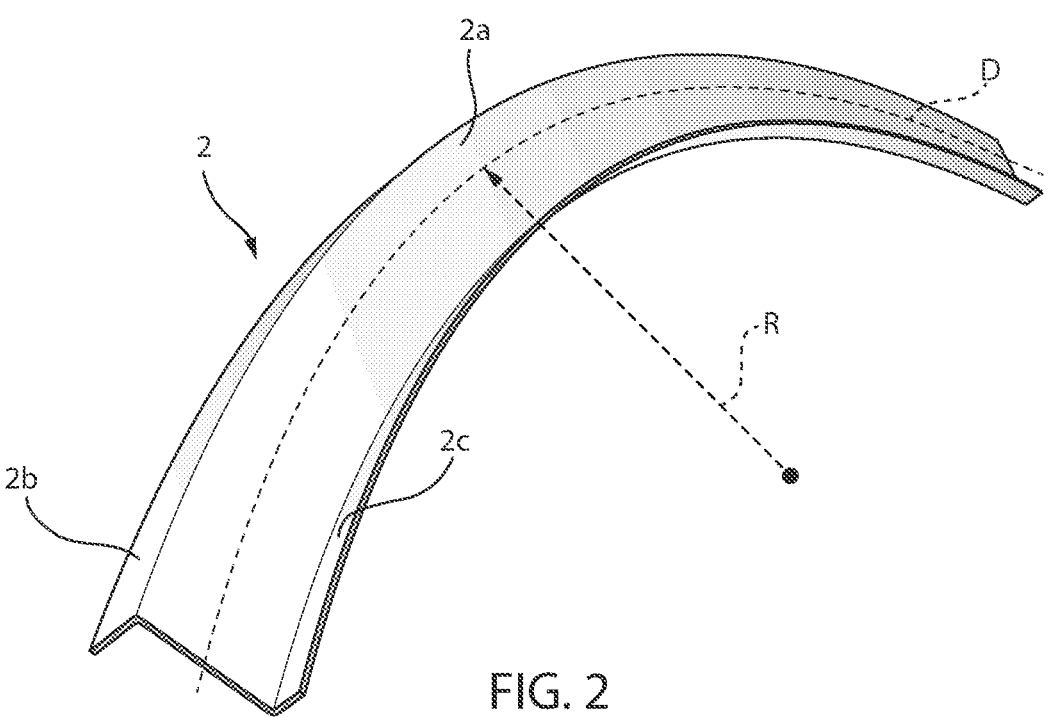
FIG. 2 shows a perspective view of a structural element in composite material with a Z-shaped profile obtained by means of the device in FIG. 1.

As can be seen in FIG. 2, the structural element 2 has a cross section in the longitudinal direction D, that is a profile, in the shape of a Z and comprises, in its final configuration shown, in addition to FIG. 2, also in FIGS. 4*c*, 5*c*, 6*b* and 7*c*, a central web 2*a* and two wings or flanges 2*b*, 2*c* extending orthogonally from opposite end portions of the web 2*a* in respective directions opposite to one another.

The longitudinal direction D has a non-zero radius of curvature R.

In one embodiment not shown, the flanges 2*b*, 2*c* could extend from the web 2*a* at a given final angle other than 90°, for example, but not exclusively, 30°, 45°, 60°, 80°, 85°, etc.

In detail, the final angles of the flanges 2*b*, 2*c* could be different from each other.

The structural element 2 described and shown herein is made starting from a plurality of layers 3 in composite material, each layer being constituted by a prepreg with polymer matrix, for example in thermosetting resin, preferably reinforced by fibers which may have a different nature, for example carbon fibers and/or aramid fibers and/or glass fibers, etc.

Alternatively, the structural element 2 could also be made starting from a prepreg with thermoplastic resin matrix, preferably reinforced with fibers of the type indicated above.

Preferably, the composite material is defined by a cured or pre-cured material.

In light of the above, each layer 3 is defined by a composite material including fibers dispersed in a thermosetting polymer matrix.

FIG. 2 shows the structural element 2 in its final configuration and obtained by means of the device 1.

The device 1 comprises a forming mold which carries a shaped portion 4.

With reference to FIGS. 1, 3 and 4*a*-4*c*, the structural element 2 is obtained by arranging, preferably by means of an automated movement, for example by means of a programmable robot 20 so as to be controlled in an automated manner, a plurality of the aforesaid layers 3 in composite material on the forming mold, in particular on the shaped portion 4 of the forming mold.

In particular, the robot 20 is configured to arrange, in an automated manner, each layer of fiber composite material on the shaped portion and by means of a predetermined orientation, conveniently different from layer to layer.

Figure 3:
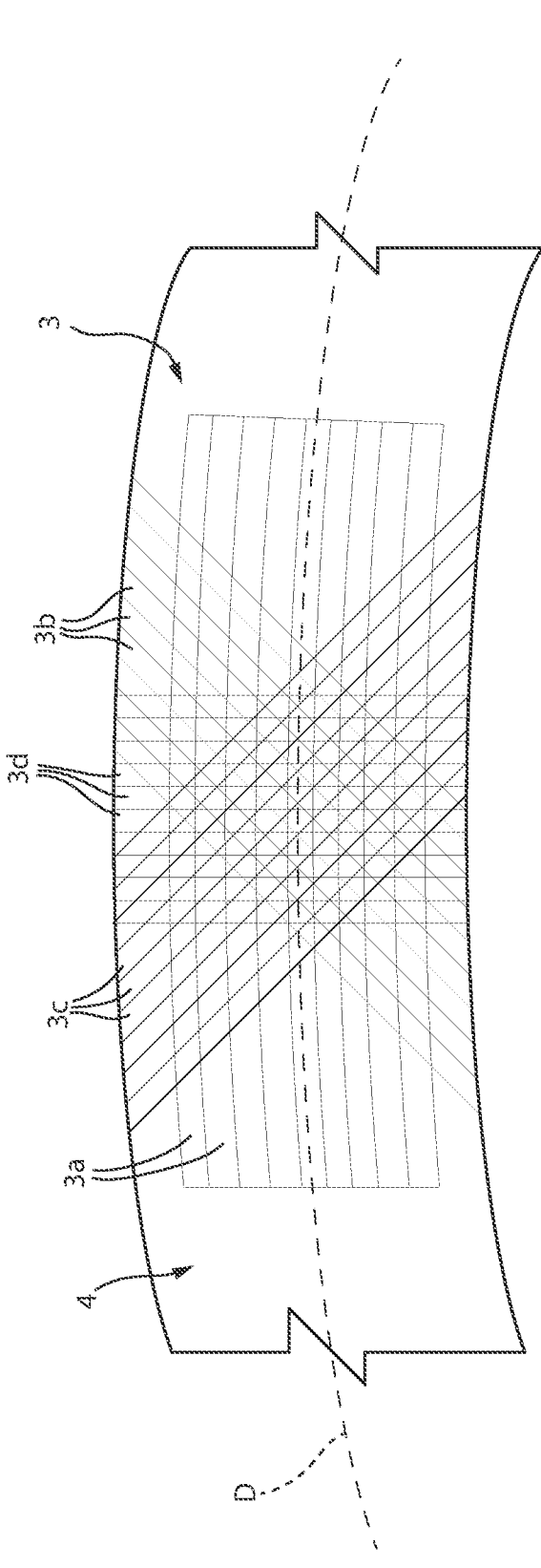
FIG. 3 is a schematic top view, on an enlarged scale and with parts removed for clarity's sake, of a detail of the device of FIG. 1 during a given operating condition.

More precisely, as can be seen in FIG. 3, the robot 20 arranges, in use, on the shaped portion 4 and according to a predetermined succession:

layers 3*a* of fiber material according to an orientation of 0° along the (curvilinear) longitudinal direction D, i.e. an orientation parallel to the longitudinal direction D;

layers 3*b* of fiber material according to an orientation of 45° with respect to the longitudinal direction D;

layers 3*c* of fiber material according to an orientation of −45° with respect to the longitudinal direction D, i.e. according to an orientation perpendicular to that of the layers 3*b*; and layers 3*d* of fiber material according to an orientation of 90° with respect to the longitudinal direction D.

In an alternative embodiment not shown, the arrangement of the layers 3 could be carried out manually by an operator.

In the example described, thanks to the use of the robot 20 for placing the layers 3, that is the fibers of the composite material, with a predetermined orientation, it is possible to obtain the so-called "steering" of these fibers, which is particularly advantageous in the case where the longitudinal direction D of the structural element 2 has a non-zero radius of curvature R, i.e. is curved. In particular, the fibers of the layers 3*a* at 0° are laminated on the shaped portion 4 directly into respective strips, each defining a continuous "single piece", with a non-zero radius of curvature R.

In this way, the fibers can be arranged directly by bending them and in a continuous manner, and not in a "broken up" and discontinuous manner. This results in significant improvements from the point of view of the mechanical properties of the structural element 2, since there are no joining portions between the fibers.

Conveniently, the structural element 2 comprises a plurality of layers 3 including layers 3*a*, 3*b*, 3*c*, 3*d* superimposed on each other according to a predetermined pattern.

Once they are arranged on the shaped portion 4, the layers 3 are laminated together, in an automated manner, for example by means of the aforesaid robot, on the shaped portion 4 and so that (FIG. 4*a*):

the web 2*a* is arranged, at least partially, in its final configuration;

a first flange 2b is arranged in its final configuration, i.e., at a given final angle, preferably orthogonally, with respect to the web 2a, more precisely with respect to the position of the web 2a arranged in its final configuration; and a second flange 2c is arranged in its initial configuration at an initial angle distinct from, and greater than, the relative final angle, preferably different from, and greater than, 90° (not right), with respect to the web 2a, more precisely with respect to the portion of the web 2a arranged in its final configuration.

Figures 4A, 4B, 4C:
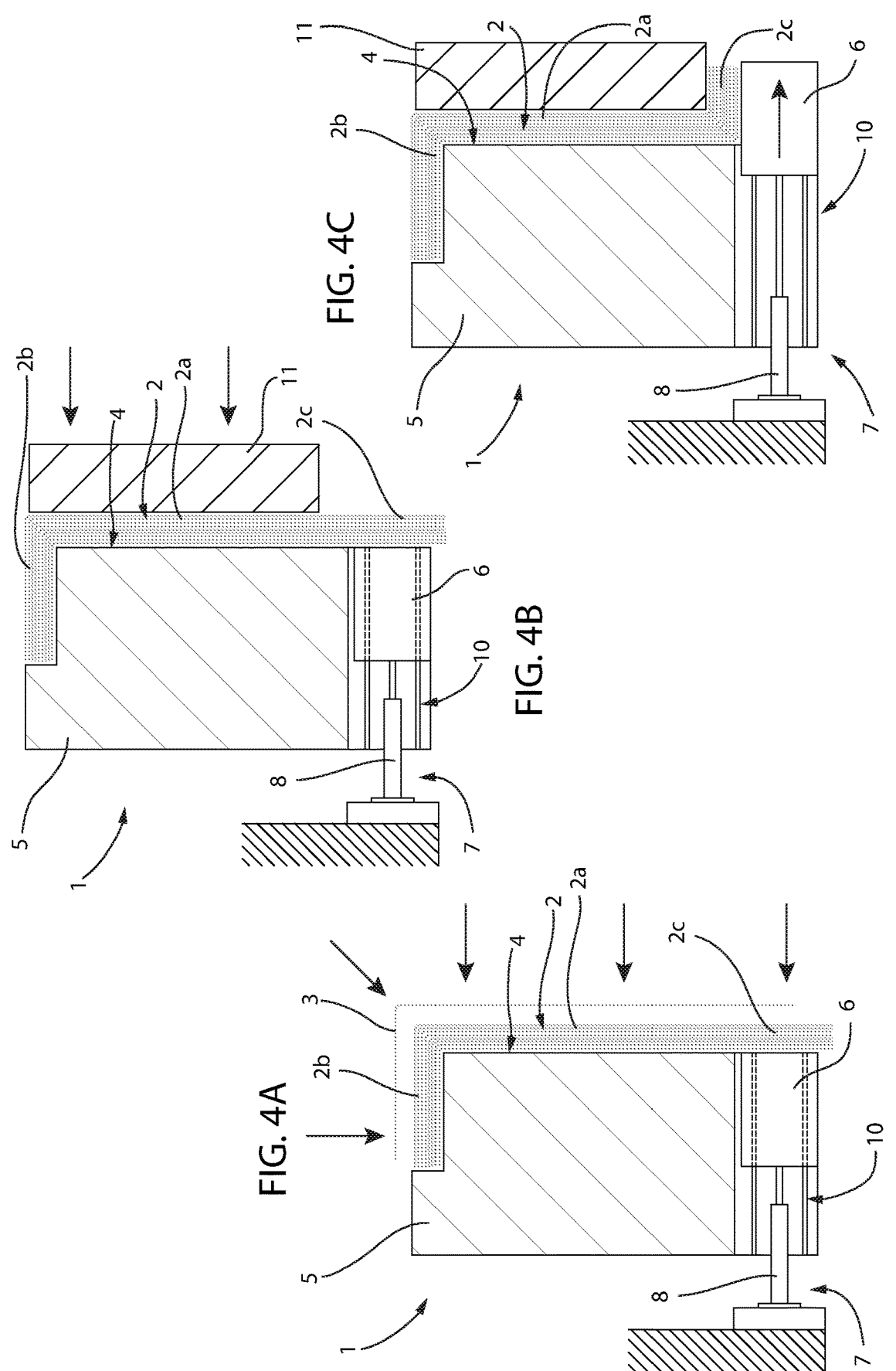
FIGS. 4*a*-4*c* schematically show, in partially sectioned view and with parts removed for clarity's sake, the device of FIG. 1 according to a first embodiment of the present invention and during three subsequent operating conditions.

In the example shown in FIG. 4a, the web 2a is entirely arranged in its final configuration and the second flange 2c is arranged at 180° with respect to the web 2a. More precisely, the second flange 2c defines an extension of the web 2a.

In other words, the layers 3 are initially arranged on the shaped portion 4 for lamination so as to form an L-shaped profile, the short side of this L-shaped profile being defined by the first flange 2b and the long side being defined by the web 2a and by the second flange 2c.

The device 1, and in particular the forming mold, comprises a fixed portion 5 and a movable portion 6 which is movable with respect to the fixed portion 5.

The fixed portion 5 and the movable portion 6 together define the shaped portion 4; more precisely, the shaped portion 4 is defined partly by an external forming surface of the fixed portion 5 and partly by an external forming surface of the movable portion 6.

As can be seen in FIGS. 4a and 4b, in use the layers 3 are laminated so that the second flange 2c is arranged at the movable portion 6.

In other words, the portion of the layers 3 constituting the second flange 2c is arranged so that it is supported by the aforesaid external forming surface of the movable portion 6.

The device 1 comprises actuator means 7 configured to drive, preferably in an automated manner, a movement of the movable portion 6, with respect to the fixed portion 5, from a rest position (FIGS. 4a and 4b) to a bending position (FIG. 4c).

In particular, the device 1 comprises a control unit (not shown) configured to drive the movement of the movable portion 6 from the rest position to the bending position in an automated manner.

Advantageously, the movable portion 6 is configured to be moved from the rest position to the bending position to move, in particular to bend, the second flange 2c from the initial configuration to the final configuration, that is, to the configuration in which it defines the aforesaid final angle, preferably a right angle (90°), with the web 2a.

More precisely, the movable portion 6 is adapted to push the second flange 2c so as to bend it, in an automated manner, from the initial configuration to the final configuration.

In this way, a structural element 2 in composite material with a Z-shaped profile (FIG. 4c) is obtained in a simple, rapid and economic manner, preferably in a totally automated way by means of the automatic movement of the movable portion 6 from the rest position to the bending position and without the manual intervention of any operator.

According to this preferred embodiment, the movable portion 6 is adapted to translate linearly with respect to the fixed portion 5.

For this purpose, the actuator means 7 comprise:

a piston 8, for example a fluid-dynamic piston (pneumatic, hydraulic or oleodynamic) fixed to one end of the movable portion 6 opposite the relative external forming surface; and a guide-slide system 10 configured to guide the movable portion 6 to define its linear translation.

Alternatively, the actuator means 7 could comprise an electrodynamic actuator, for example a linear motor (not shown) defined by the guide-slide system 10.

In use, the piston 8 is drivable in order to drive the linear translation movement guided by the guide-slide system 10 of the movable portion 6 from the rest position to the bending position.

Conveniently, the actuation of the piston 8 is controlled automatically by the control unit.

Alternatively, the piston 8 could be driven manually by an operator.

Preferably, the device 1 includes infrared means, for example at least one infrared lamp, known per se and not described or shown in detail, configured to emit an infrared radiation towards the layers 3 during the lamination operation and, in particular, during the subsequent forming operation, so as to make the resin which pre-impregnates the material slightly less viscous and to make the layers 3 slide together. In this way, wrinkles are avoided during the forming, in particular during the bending of the second flange 2c.

In one embodiment, the infrared means are carried by the robot 20.

Conveniently, the device 1 further comprises an abutment body 11 which can be displaced between a rest position (not shown) and a compression position (FIG. 4b) against the plurality of layers 3 and so that the web 2a is interposed between the abutment body 11 and the shaped portion 4 (i.e. the forming mold).

In detail, the abutment body 11 is configured to be arranged against the web 2a.

In use, the aforesaid control unit drives the displacement of the abutment body 11 into the compression position to compact at least the web 2a.

Conveniently, the displacement (bending) of the second flange 2c is carried out, by means of the movable portion 6, until the second flange 2c abuts against the abutment body 11, as can be seen in FIG. 4b.

In this way, a more effective bending of the second flange 2c can be achieved, ensuring the correct final angle of the second flange 2c with respect to the web 2a, in particular the aforesaid angle of 90°.

Preferably, once the lamination and forming of the structural element 2 have been completed according to the method described above, the structural element 2 is arranged, in use and according to a known method and not described in detail, in a curing or co-curing device (known per se and not shown) to perform at least one curing or co-curing cycle.

In greater detail, the structural element 2 is inserted inside a vacuum bag and placed inside the curing or co-curing device (typically an autoclave) in order to be subjected to a certain pressure and a certain temperature, which are known in the industry.

In the light of the above, a polymerisation cycle of the structural element 2 is carried out.

If the resin of the matrix is of the thermoplastic type, one or more "consolidation" cycles are carried out, according to a known method that is not described in detail.

Figures 5A, 5B, 5C:
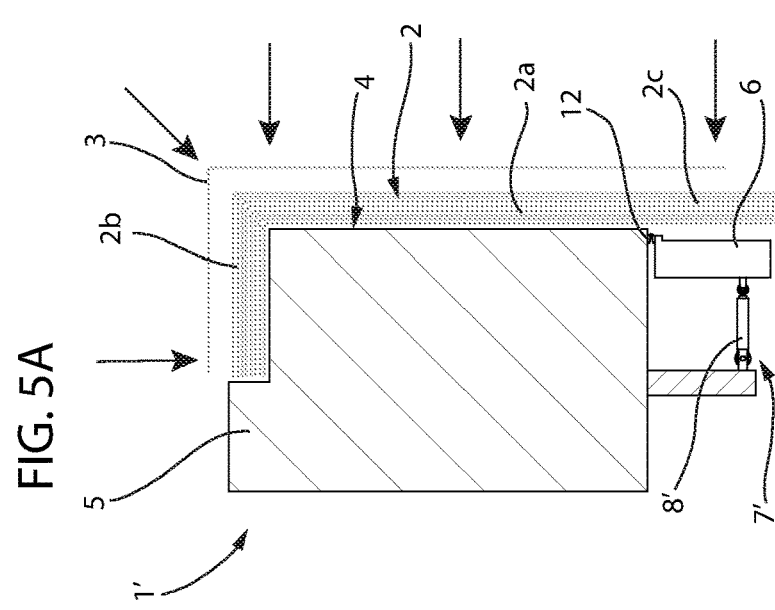
FIGS. 5*a*-5*c* schematically show, in partially sectioned view and with parts removed for clarity's sake, the device of FIG. 1 in accordance with a second embodiment of the present invention and during three subsequent operating conditions.

With reference to FIGS. 5*a*, 5*b* and 5*c*, number 1' denotes a device for the manufacture of a structural element 2 in composite material with a Z-shaped cross section (profile) made in accordance with a second embodiment of the present invention.

Since the device 1' is structurally and functionally similar to the device 1, it will be described in the following only in the aspects which distinguish it from this device 1, indicating, where possible, corresponding parts and components with the same reference numbers.

In particular, the device 1' differs from the device 1 in that the movable portion 6 is hinged to the fixed portion 5 by means of a hinge 12 and in that it comprises actuator means 7' configured to move the movable portion 6 with respect to the fixed portion 5 from the rest position to the bending position in a pivoted manner with respect to the hinge 12.

In the example described, the actuator means 7' comprise a piston 8', for example a fluid-dynamic piston (pneumatic, hydraulic or oleodynamic) fixed to one end of the movable portion 6 opposite the relative external forming surface.

The piston 8' is configured to be driven by the control unit in an automated manner.

Alternatively, the piston 8' could be driven manually by an operator.

In light of what has been described above, the movable portion 6 is adapted to be moved, preferably in an automated way, between the rest position and the bending position by means of the piston 8', performing a rotation pivoted around the hinge 12.

In this way, it is possible to obtain the bending of the second flange 2*c* in its final configuration by means of a simpler structure and in an even more effective manner than in the case where device 1 is used, since the latter configuration does not require a guide-slide system 10.

Figure 6A:
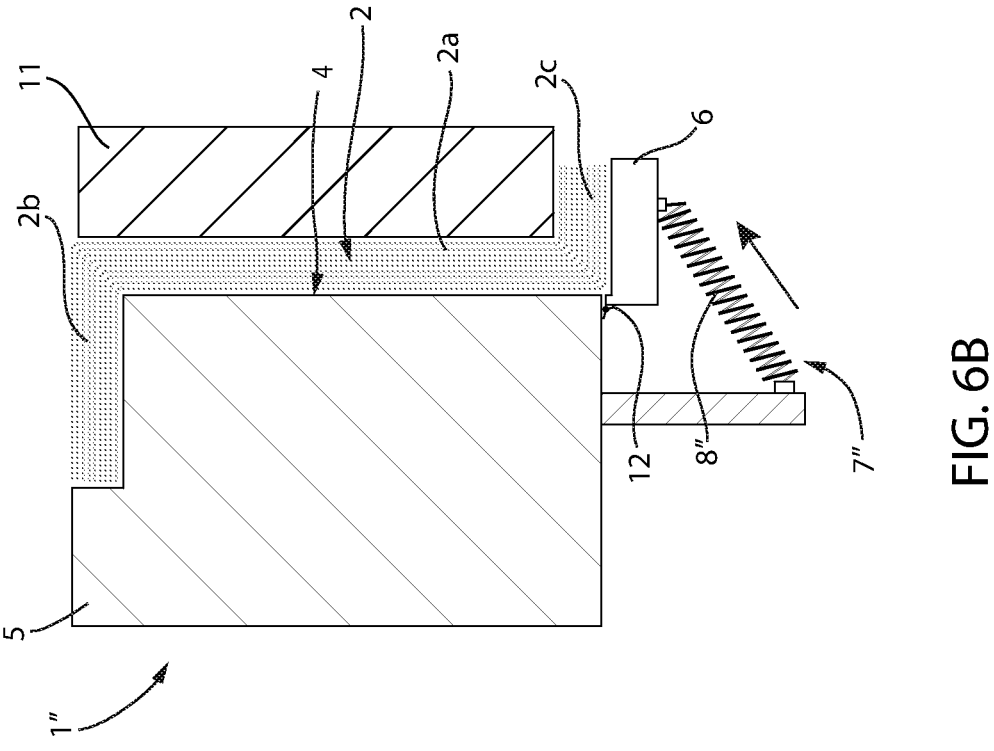
FIGS. 6*a* and 6*b* schematically show, in partially sectioned view and with parts removed for clarity's sake, the device of FIG. 1 according to a third embodiment of the present invention and during two subsequent operating conditions.
Figure 6B:
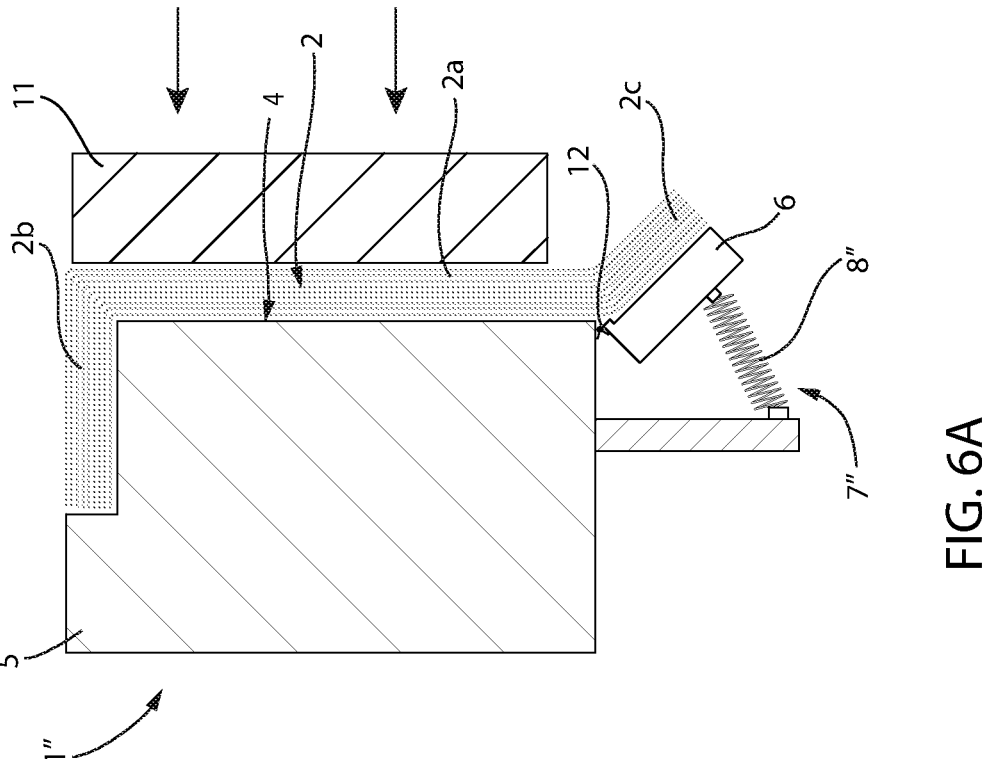

With reference to FIGS. 6*a* and 6*b*, number 1" denotes a device for the manufacture of a structural element 2 in composite material with a Z-shaped cross section (profile) made in accordance with a third embodiment of the present invention.

Since the device 1" is structurally and functionally similar to the device 1', it will be described in the following only in the aspects which distinguish it from this device 1', indicating, where possible, corresponding parts and components with the same reference numbers.

In particular, the device 1" differs from the device 1' in that it comprises elastic return means 7", defining the aforesaid actuator means, interposed between the fixed portion 5 and the movable portion 6 and configured to be released, preferably in an automated manner, from a deformed position to an undeformed position to drive the movement of the movable position 6 from the rest position to the bending position, preferably in an automated manner.

In detail, the elastic return means 7" comprise a spring 8", preferably a helical spring, fixed, at a first end, to an end of the movable portion 6 opposite the relative external forming surface and, at the second end, to the fixed portion 5.

The spring 8" is compressed in the deformed position to keep the movable portion 6 in the rest position, during the lamination of the layers 3 on the shaped portion 4.

In use, the spring 8" can be released, preferably in an automated manner by command of the control unit, from the compressed deformed position (FIG. 6*a*) to an extended undeformed position (FIG. 6*b*), so as to displace the movable portion 6 from the rest position to the bending position and thus determining the bending of the second flange 2*c*.

Alternatively, the spring 8" could be driven manually by an operator.

This configuration makes it possible to obtain a system for driving the movement of the mobile portion 6 that is even simpler than that of the previously described embodiments.

Conveniently, the device 1" differs from the device 1' in that the movable portion 6 is placed, in its initial rest position, at an angle other than 180° with respect to the fixed portion 5, in particular at an angle greater than 90° and lower than 180°.

As shown in FIG. 6°, this allows the layers 3 to be laminated on the shaped portion 4 so that the second flange 2*c* is placed, in its initial configuration, at an angle other than 180° with respect to the web 2*a*, in particular at an angle greater than 90° and lower than 180° with respect to the web 2*a*.

This particular arrangement means that the bending of the second flange 2*c* is in some way already "initiated", or preliminarily carried out, during the lamination by means of the robot 20. This has the further advantage that during the actual bending of the second flange 2*c* by means of the movable portion 6, the second flange 2*c* presents a lead-in to the bending and adapts to it more easily.

Moreover, thanks to this conformation, the shaped portion 4, that is the mold, is particularly suitable for an automatic lamination, i.e. carried out by means of the robot 20 in an automated manner.

Figures 7A, 7B, 7C:
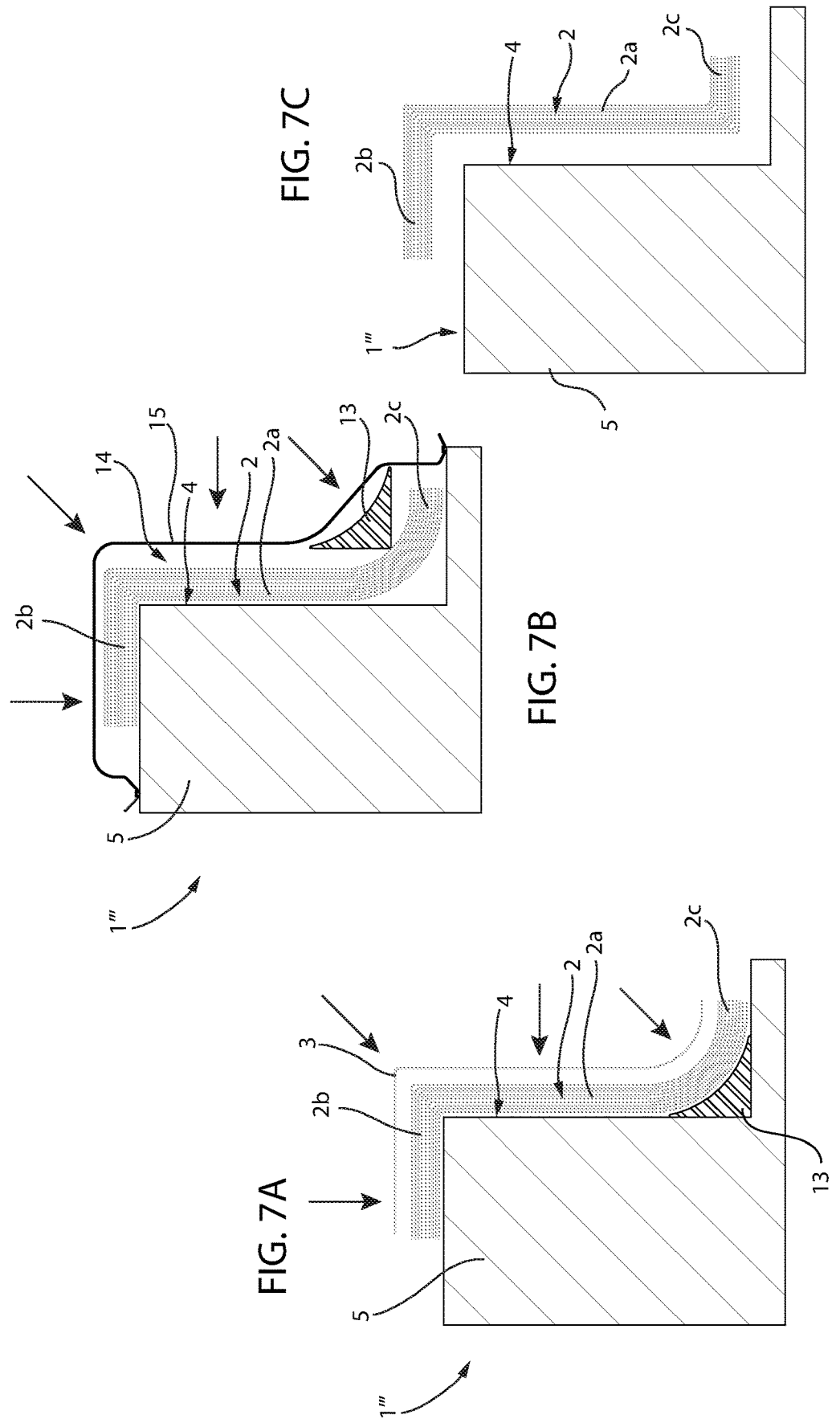
FIGS. 7*a*-7*c* schematically show, in a partially sectioned view and with parts removed for clarity's sake, three subsequent operating conditions of the device of FIG. 1 according to a fourth embodiment shown for illustrative purposes only and not included in the scope of protection of the claimed invention but useful for understanding it.

With reference to FIGS. 7*a*, 7*b* and 7*c*, number 1''' denotes a device for the manufacture of a structural element 2 in composite material with a Z-shaped cross section (profile) made in accordance with a fourth embodiment shown by way of example only and not included in the scope of protection of the claimed invention, but useful for understanding it. In detail, this fourth embodiment is not included in the scope of protection of the independent claims.

Since the device 1''' is structurally and functionally similar to the device 1, it will be described in the following only in the aspects which distinguish it from this device 1, indicating, where possible, corresponding parts and components with the same reference numbers.

In particular, the device 1''' differs from the device 1 in that it comprises an insert 13 defining the movable portion 6 and configured to be arranged in an interposed position between the shaped portion 4 and the plurality of layers 3 to support at least part of the second flange 2*c*, preferably the entire second flange 2*c*, in its initial configuration during the aforesaid lamination (FIG. 7*a*).

The insert 13 can be displaced, in use and in an automated manner, for example by means of the aforesaid robot, from the interposed position, defining the aforesaid rest position, to an external position with respect to the plurality of layers 3 so that the second flange 2*c* is interposed between the insert 13 and the shaped portion 4 (FIG. 7*b*).

The insert 13 is movable from the external position into a compression position, defining the aforesaid bending position, to compress the second flange 2*c* against the shaped portion and displace it from the initial configuration to the final configuration (shown in FIG. 7*c*).

Preferably, the insert 13 is movable in an automated manner, for example by means of the robot 20, which in this case defines the aforesaid actuator means.

Alternatively, the insert 13 could be displaced manually by an operator from the interposed position to the external position.

This particular embodiment has the further advantage that, thanks to the presence of the insert 13 interposed between the shaped portion 4 and the layers 3, the layers 3 themselves can be laminated by means of the robot 20 also on a mold, that is, on a shaped portion 4, shaped like a "Z", as can be seen in FIGS. 7a, 7b and 7c.

Without the insert 13 it would in fact be complicated for the compaction roller of the robot 20 (known per se and not shown in detail) to laminate the layers 3 at the internal right angle, i.e. the one at which the second flange 2c extends from the web 2a.

Therefore, thanks to the presence of the insert 13, it is possible to obtain a structural element 2 with a Z-profile in an automated way and using common and Z-shaped molds (shaped portions 4), thus implementing them in an automatic lamination process by means of an automatic robot 20.

Conveniently, in use, the laminated layers 3 and the insert 13 displaced to the external position are housed in a vacuum chamber 14 delimited between a vacuum bag 15 (of a known type and not described in detail) and the shaped portion 4 (therefore between the vacuum bag 15 and the forming mold).

At this point, a vacuum is applied inside the vacuum chamber 14, so as to displace the insert 13 from the external position to the compression position to cause the bending of the second flange 2c, and optionally of the portion of the web 2a in the initial configuration, from the initial configuration into the final configuration.

From an examination of the characteristics of the device 1, 1', 1" and the manufacturing method realized according to the present invention, the advantages they allow to be obtained are evident.

In particular, the device 1, 1', 1" and the manufacturing method according to the present invention allow to realize structural elements 2 in composite material with a Z-shaped cross section (profile) by means of operations which can be easily automated, thus increasing the degree of automation of the manufacturing process of said structural elements 2 and, at the same time, allowing, when and if deemed appropriate, to implement said process through the manual intervention of an operator.

In fact, the actuator means 7, 7', 7" configured to move the movable portion 6 can be driven either automatically or manually through the intervention of an operator.

This results in an extremely flexible manufacturing process.

Furthermore, the architecture of the device 1, 1', 1" is extremely simplified with respect to known automated manufacturing devices, which are often bulky and expensive.

It is clear that the device 1, 1', 1" and the method described and shown herein may be subject to modifications and variations without thereby departing from the scope of protection defined by the claims.

In particular, the movable portion 6 could be moved manually by an operator.

The invention claimed is:

1. Method for manufacturing a structural element in composite material extending along a straight or curvilinear longitudinal direction, having a cross section Z-shaped with respect to the longitudinal direction and comprising, in its final configuration, a central web and two flanges extending at a given final angle from opposite end portions of the web in respective directions opposite to one another; the method including the steps of:

a) arranging a plurality of layers of composite material on a shaped portion of a forming mold;

b) laminating said plurality of layers on the shaped portion so that the web is arranged, at least partially, in its final configuration, that a first flange is arranged in its final configuration at said final angle with respect to the portion of the web arranged in its final configuration, and that a second flange is arranged in its initial configuration at an initial angle distinct from, and greater than, said final angle with respect to the portion of the web arranged in its final configuration;

c) moving a movable portion of said forming mold, which is movable with respect to a fixed portion of said forming mold, from a rest position to a bending position, the fixed portion and the movable portion defining, together, the shaped portion, the shaped portion being defined partly by an external forming surface of the fixed portion and partly by an external forming surface of the movable portion;

d) displacing said second flange from the initial configuration into a final configuration in which it is at said final angle with respect to the portion of the web arranged in its final configuration;

the step b) of laminating being carried out by arranging the second flange at the movable portion;

the step d) of displacing being carried out by means of the step c) of moving; wherein the step a) of arranging is carried out by positioning the second flange at the movable portion;

and wherein the step c) of moving comprises releasing an elastic return means from a deformed condition to an undeformed condition.

2. The method as claimed in claim 1, wherein the step c) of moving comprises the step of:

e) pushing the second flange by means of the movable portion;

and wherein the step d) of displacing includes the step of:

f) folding the second flange from the initial configuration to the final configuration by means of the movement of the movable portion from the rest position to the folding position.

3. The method as claimed in claim 1, wherein the step c) of moving comprises driving a fluid-dynamic or electrodynamic actuator.

4. The method as claimed in claim 1, and further comprising the steps of:

e) arranging an abutment body against said plurality of layers so that at least said web is interposed between the abutment body and the shaped portion; and f) moving the abutment body towards the shaped portion to compact at least said web;

and wherein the step d) of displacing is carried out by pushing the second flange, by means of the movable portion-(6), until it abuts against the abutment body.

5. Device for the manufacture of a structural element in composite material extending along a straight or curvilinear longitudinal direction, having a cross section Z-shaped with respect to the longitudinal direction comprising a plurality of layers of composite material and having, in its final configuration, a central web and two flanges extending at a given final angle from opposite end portions of the web in respective directions opposite to one another;

said device comprising a forming mold having a shaped portion configured to support the plurality of layers of composite material, which are configured to be arranged on the shaped portion and to be laminated together on the shaped portion and in such a way that, in use, the web is arranged, at least partially, in its final configuration, that a first flange is arranged in its final configuration at said final angle with respect to the portion of the web arranged in its final configuration, and that a second flange is arranged in its initial configuration at an initial angle distinct from, and greater than, said final angle with respect to the portion of the web arranged in its final configuration;

said device, and in particular said forming mold, comprising a fixed portion and a movable portion, which is movable with respect to the fixed portion, the portion fixed portion and the movable portion defining, together, said shaped portion, the shaped portion being defined partly by an external forming surface of the fixed portion and partly by an external forming surface of the movable portion;

the second flange being configured to be arranged and laminated at the movable portion;

said movable portion being configured to be moved from a rest position to a bending position to move the second flange from the initial configuration to the final configuration; and elastic return means interposed between the fixed portion and the movable portion and configured to be released from a deformed position to an undeformed position to drive the movement of the movable portion from the rest position to the bending position.

6. Device as claimed in claim 5, and comprising a fluid-dynamic or electrodynamic actuator drivable to move the movable portion from the rest position to the bending position.

* * * * *